(12) United States Patent
Chang et al.

(10) Patent No.: US 9,049,549 B2
(45) Date of Patent: Jun. 2, 2015

(54) METHOD AND APPARATUS FOR PROBABILISTIC USER LOCATION

(71) Applicant: xAd, Inc., New York, NY (US)

(72) Inventors: Chi-Chao Chang, Palo Alto, CA (US); Mauricio Mediano, Campbell, CA (US); Srihari Venkatesan, Cuppertino, CA (US); Prakash Muttineni, San Ramon, CA (US); Dipanshu Sharma, New York, NY (US)

(73) Assignee: xAd, Inc., New York, NY (US)

( * ) Notice: Subject to any disclaimer, the term of this patent is extended or adjusted under 35 U.S.C. 154(b) by 147 days.

(21) Appl. No.: 13/867,021

(22) Filed: Apr. 19, 2013

(65) Prior Publication Data

US 2014/0128104 A1 May 8, 2014

Related U.S. Application Data

(60) Provisional application No. 61/724,295, filed on Nov. 8, 2012, provisional application No. 61/724,298, filed on Nov. 8, 2012, provisional application No. 61/724,299, filed on Nov. 8, 2012.

(51) Int. Cl.
| | |
|---|---|
| *H04W 4/02* | (2009.01) |
| *G06Q 30/02* | (2012.01) |
| *G06F 17/30* | (2006.01) |
| *H04L 29/08* | (2006.01) |

(52) U.S. Cl.
CPC ............ *H04W 4/02* (2013.01); *G06Q 30/0205* (2013.01); *G06F 17/30011* (2013.01); *G06F 17/30241* (2013.01); *G06F 17/30321* (2013.01); *G06Q 30/0261* (2013.01); *H04L 67/20* (2013.01); *H04W 4/021* (2013.01); *H04W 4/028* (2013.01)

(58) Field of Classification Search
CPC ......... H04W 4/02; H04W 4/028; G01C 21/00
USPC ................... 455/456.1–457; 701/300, 454
See application file for complete search history.

(56) References Cited

U.S. PATENT DOCUMENTS

| | | | |
|---|---|---|---|
| 2009/0005987 A1* | 1/2009 | Vengroff et al. | 701/300 |
| 2014/0057650 A1* | 2/2014 | Versteeg et al. | 455/456.1 |

(Continued)

OTHER PUBLICATIONS

Non-Final Office Action, U.S. Appl. No. 13/867,029, filed Apr. 19, 2013, entitled "Method and Apparatus for Geographic Document Retrieval," issued Mar. 6, 2015.

(Continued)

*Primary Examiner* — Kashif Siddiqui
*Assistant Examiner* — Farideh Madani
(74) *Attorney, Agent, or Firm* — Jamie J. Zheng, Esq.

(57) ABSTRACT

A method of delivering location-based information comprises receiving a request including a location indicator from a packet-based network and translating the location indicator into a probabilistic representation of one or more possible locations of a mobile user based on historical data collected from mobile devices. By generating the probabilistic user location representation, the method can be used to deal with the inherent uncertainty in user location data, particularly in a mobile world. In some embodiments, this is done by using validation, context analysis, creation of consistent groups, and probability allocation procedures. Location-based document retrieval can be enabled using the probabilistic user location representation.

24 Claims, 12 Drawing Sheets

(56) References Cited

U.S. PATENT DOCUMENTS

2014/0067938 A1* 3/2014 Boldyrev et al. ............. 709/204
2014/0344718 A1* 11/2014 Rapaport et al. ............. 715/753

OTHER PUBLICATIONS

Zhou, Hybrid Index Structures for Location-based Web Search, 2005, http://delivery.acm.org/10./1145/1100000/1099584/p155-zhou.pdf?ip=151.207.250.71&id=1099584&acc=ACTIVE%20SERVICE&key=C15944E53D0ACA63%2E4D4702B0C3E38B35%2E4D4702B0C3E38B35%2E4D4702B0C3E38B35&CFID=481269756&CFTOKEN=78369420&_acm_=1424702083_2be6d2c783b6de99b7aae8Oda8fac423.

* cited by examiner

METHOD AND APPARATUS FOR PROBABILISTIC USER LOCATION

CROSS REFERENCE TO RELATED APPLICATIONS

The present application claims the benefit of priority from U.S. Provisional Application No. 61/724,295 entitled "Method and Apparatus for Probabilistic User Location," filed on Nov. 8, 2012, U.S. Provisional Application No. 61/724,298 entitled "Method and Apparatus for Dynamic Fencing," filed on Nov. 8, 2012, and U.S. Provisional Application No. 61/724,299 entitled "Method and Apparatus for Geographic Document Retrieval," filed on Nov. 8, 2012, each of which is incorporated herein by reference in its entirety. The present application is related to commonly assigned U.S. patent application entitled "Method and Apparatus for Dynamic Fencing," filed on even date herewith and to U.S. patent application entitled "Method and Apparatus for Geographic Document Retrieval," filed on even date herewith, each of which is incorporated herein by reference in its entirety.

FIELD

The present disclosure is related to location-based mobile applications, and more particularly to information retrieval based on probabilistic user location.

DESCRIPTION OF THE RELATED ART

With the widespread use of mobile devices such as smart phones, many mobile applications provide services to users based on their locations. For example, user locations can be used to decide what advertisement (ad) to serve on mobile devices. User location data is typically provided by mobile applications, publishers, and client-side software and represented by latitude and longitude coordinates (LL), IP addresses (IP), postal or zip codes (ZC), and city-state names (CS), as well as a combination thereof. Ad servers generally apply a set of heuristics based on assumptions about the accuracy and granularity of this data, and process them based on a deterministic interpretation of their meanings. In other words, it interprets the location data literally: the user is at a LL coordinate, or the user is in Palo Alto, Calif., or the user resides in zip code 94304 if the meaning is provided by a mobile application who claims they send along ZCs representing the homes of the users with explicit consent.

Such deterministic interpretation of location has been a standard practice in the industry since the advent of ad marketplace for mobile devices for at least the last five years. It is fundamentally flawed because one is never certain where the user actually is at the time when the Ad servers process the data, even if one assumes that the data is correct. For example, suppose a user is travelling at 55 miles per hour down a highway and accessing a mobile application. By the time a request is issued to the server with an LL coordinate and a banner ad is returned and fully rendered in the application, the actual location of the user is no longer at the same LL. Similar examples can be constructed using ZC and city-state boundaries around the fringes and boundaries of these arbitrary areas.

SUMMARY

A novel method of dealing with the inherent uncertainty in user location data, particularly in a mobile world, involves generating a probabilistic user location representation. In some embodiments, this is done by using validation, context analysis, creation of consistent groups, and probability allocation procedures. Location-based document retrieval can be enabled using the probabilistic user location representation.

In some embodiments, a method of delivering location-based information comprises receiving a request from a packet-based network. The request includes a location indicator, and the location indicator includes at least one of: (1) a code associated with a place or region (e.g., a zip code), (2) a name associated with a place or region (e.g., city, state, etc.), (3) geographical coordinates (e.g., longitude/latitude), and (4) a network address (e.g., Internet Protocol (IP) address). The method further comprises translating the location indicator into a probabilistic representation of one or more possible locations of a mobile user based on the location indicator and historical data collected from mobile devices, retrieve information from a computer readable medium based on the probabilistic representation; and transmit the information to the packet-based network for receipt by the mobile user.

In some embodiments, the method is carried out by a computer system executing a computer program. The computer system includes connections to the packet-based network and one or more data stores storing therein the historical data collected from mobile devices communicating with the packet-based network. When executing the computer program, the computer system provides an interface engine configured to receive the request from the packet-based network via the connections, and a smart location engine configured to translate the location indicator into the probabilstic representation of one or more possible locations of the mobile user based on the location indicator and historical data collected from mobile devices. The computer system may further provide a fencing engine configured to provide one or more fenced areas. The fencing engine may be further configured to compare the probable areas with the one or more fenced areas to obtain one or more target areas each having an associated weight. The computer system may further provide a document retrieval engine configured to retrieve location-based information from the one or more data stores based on the target areas. In some embodiments, the interface engine is further configured to transmit the location-based information to the packet-based network for receipt by the mobile user.

DESCRIPTION OF THE EMBODIMENTS

Figure 1A:
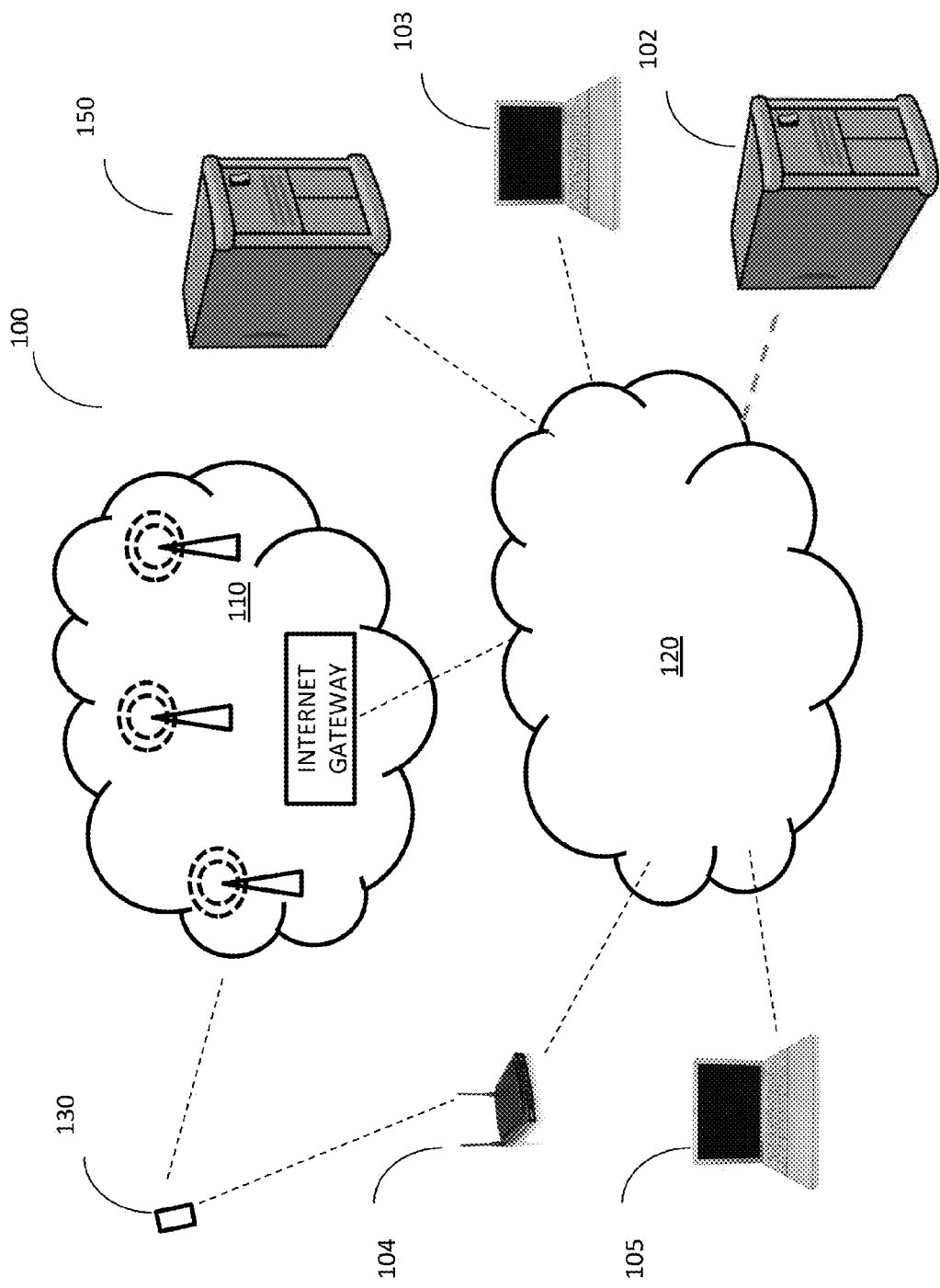
FIG. 1A is a diagram illustrating a packet-based network via which a mobile device may interact with one or more servers according to one embodiment of the present disclosure.

A novel method and apparatus for probabilistic user location (i.e., smart location) is developed to represent user locations in a probabilistic manner. In one embodiment, traditional location data is translated into smart location information or smart location data, which can be probabilistic representations of user locations based on historical, aggregate data collected from many requests from mobile devices. For example, conventional location input data types, e.g., strings, integers, are converted into structures storing two-dimensional density functions, which represent the likelihood of a user being at a given coordinate. In other words, points in a map rather than integers (such as "94304") and strings (such as "Palo Alto, Calif.") are used to represent user locations.

In one embodiment, a probabilistic user location model is provided where a user is associated with multiple regions with different probabilities in response to a request including information about various input signals (LL, IP, ZC, CS) as well as additional context including time of the day. Afterwards, a spatial representation of a user location can be derived by:
1. Using of an arbitrary polygon for each location region, which is no longer confined to a ZC, city, DMA etc.;
2. Providing variable granularity, which could be smaller than a ZC, or larger than a ZC) since a single region could span multiple ZCs (or cities) along the boundaries; and
3. Using multiple polygons for a user's approximated location.

Validation and allocation procedures that use probability distributions to deal with uncertain data are then used to derive a user's spatial location representation.

In a further embodiment, the accuracy of user location is measured in a statistical setting based on user feedback data (such as click-through rates and secondary action rates).

In a further embodiment, conditions under which an IP can be treated as a proxy to user identity over a period of time (e.g., a few days) can be determined, and associated locations are exploited as probable regions to select from when this IP comes with a request over a subsequent period of time. IPs as proxies for users, whenever applicable, can improve the ability to deliver more relevant advertisement to this particular IP or user.

In some embodiments, weights distributions act as proxies to true locations, and business location information (e.g., information coming from publishers and 3rd party data sources) can be used to correlate, correct, and resolve uncertainty in location data. For example, information from publishers can be used to assign publisher specific weights based on location type. In a further example, the probabilities derived from weights influence decisions at serving time, and new weights are derived from these decisions, thus introducing a feedback loop. Using such data-driven optimization, improved accuracy can be obtained as the volume of historical data accumulated over time increases. The accuracy should also increase as the region representation includes more points.

In some embodiments, the ability to find and retrieve relevant ads (fill-rate and/or CTR) can be enhanced through the use of allocation procedures that distribute incoming requests to smaller regions within a ZC following request distribution of good LLs.

Although most of the embodiments are described herein in the context of mobile advertisement, the techniques associated therewith can have widespread applications, including, but not limited to:
1. Ad networks, where the location is used as a feature to return relevant ads.
2. Social networks, where friends' activities are correlated by location, to suggest friends or communities with shared interest by location.
3. Surveillance, tracking, to find people, deal with emergencies, track progress of field employees, etc.
4. Search, to provide relevant results using location to disambiguate results.
5. Travel and local, to suggest interesting places for people traveling and exploring locations.

In some embodiments, the smart location information can be annotated and piped into ranking models. For example, a service can be called to return a set of documents whose geographical locations intersect regions associated with the smart location information, i.e., smart location regions. The smart location regions, the documents returned and the information that joins them (e.g. area intersected), are fed into a model that ranks and filters the documents. For ad networks, this service could be a geographical document retrieval service described in the commonly assigned co-pending U.S. patent application entitled "Method and Apparatus for Geographical Document Retrieval," filed on even date herewith. Similar services could also fit the other applications above.

Figure 1B:
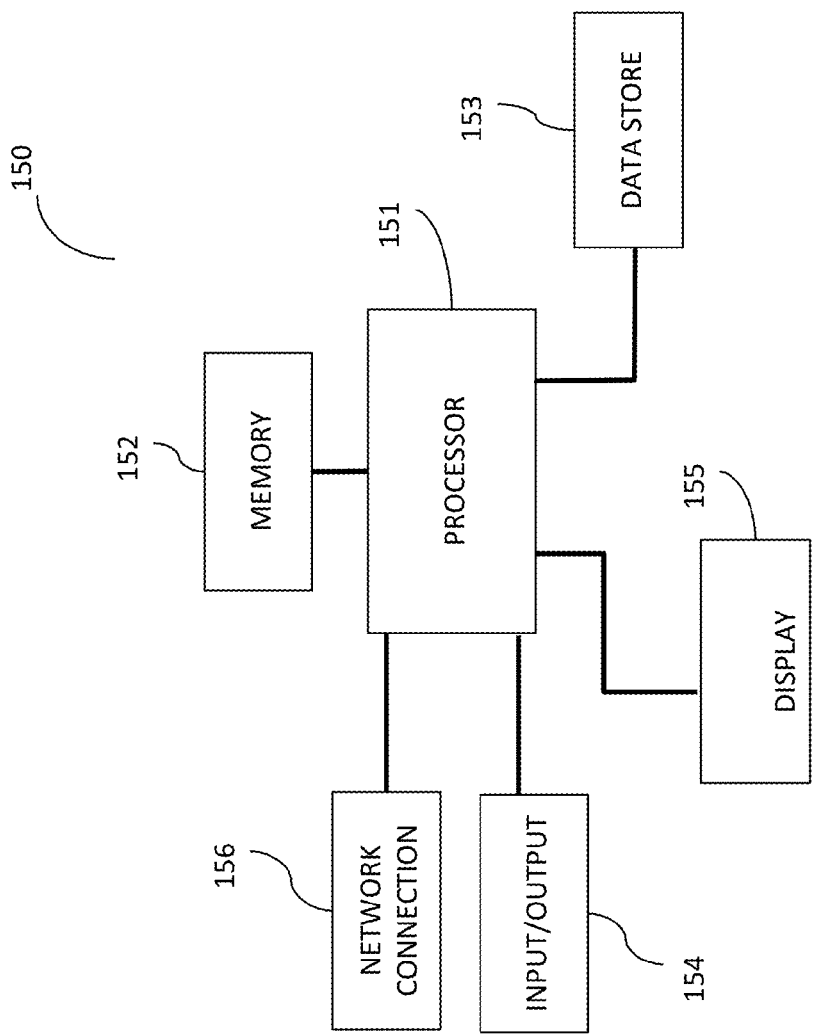
FIG. 1B is a block diagram illustrating a computer system that can be used to carry out a method for smart location according to one embodiment of the present disclosure.

FIG. 1A illustrates a packet-based network 100 (referred sometimes herein as "the cloud"), which, in some embodiments, includes part or all of a cellular network 110, the Internet 120, and computers and servers coupled to the Internet. The computers and servers can be coupled to the Internet 120 using wired Ethernet and optionally Power over Ethernet (PoE), WiFi, and/or cellular connections. As shown in FIG. 1B, a mobile device 130 such as a smart phone is also coupled to the packet-based network via WiFi or cellular connections. When a WiFi hotspot (such as hotspot 104) is available, the mobile device 130 may connect to the Internet via the WiFi hotspot using its built-in WiFi connection. Mobile device 130 may also communicate with the cellular network using its built-in cellular connection to connect to the cellular network 110, which is coupled to the Internet 120 via an Internet Gateway. Thus, the mobile device may interact with other computers/servers coupled to the Internet.

As shown in FIG. 1B, the computers/servers coupled to the Internet may include one or more computers/servers 150 that is used to execute one or more software programs to carry out one or more methods of location-based document retrieval of certain embodiments, one or more computers/servers 102 associated with a mobile publisher, one or more computers/servers 103 associated with an on-line marketer, and other computers/servers 105.

In one embodiment, the one or more methods of location-based document retrieval are performed using a computer system (e.g., a server computer) executing one or more software programs. FIG. 1B is a block diagram of an example of such a computer system 150, which includes a processor 151, a memory 152, one or more data stores 153, input/output devices 154 such as keyboard/mouse/touchscreen, one or more display devices 155, such as a monitor, a wired and/or wireless connections 156 to a network, such as a local area network and/or a wide area network (e.g., the Internet 120). The software programs can be stored in a computer readable medium (such as a data store 153 and or other portable computer readable medium that is not shown). When loaded in the memory 152 and executed by the processor 151, the software programs cause the processor to carry out the smart location method and/or any of the other methods described herein. In one embodiment, location-based documents/information and historical, aggregate data collected from many requests from mobile devices are also store in the data store 153. The one or more data stores 153 can be computer readable media local to the processor 151 or coupled to the processor via a local or wide-area network.

Figure 1C:
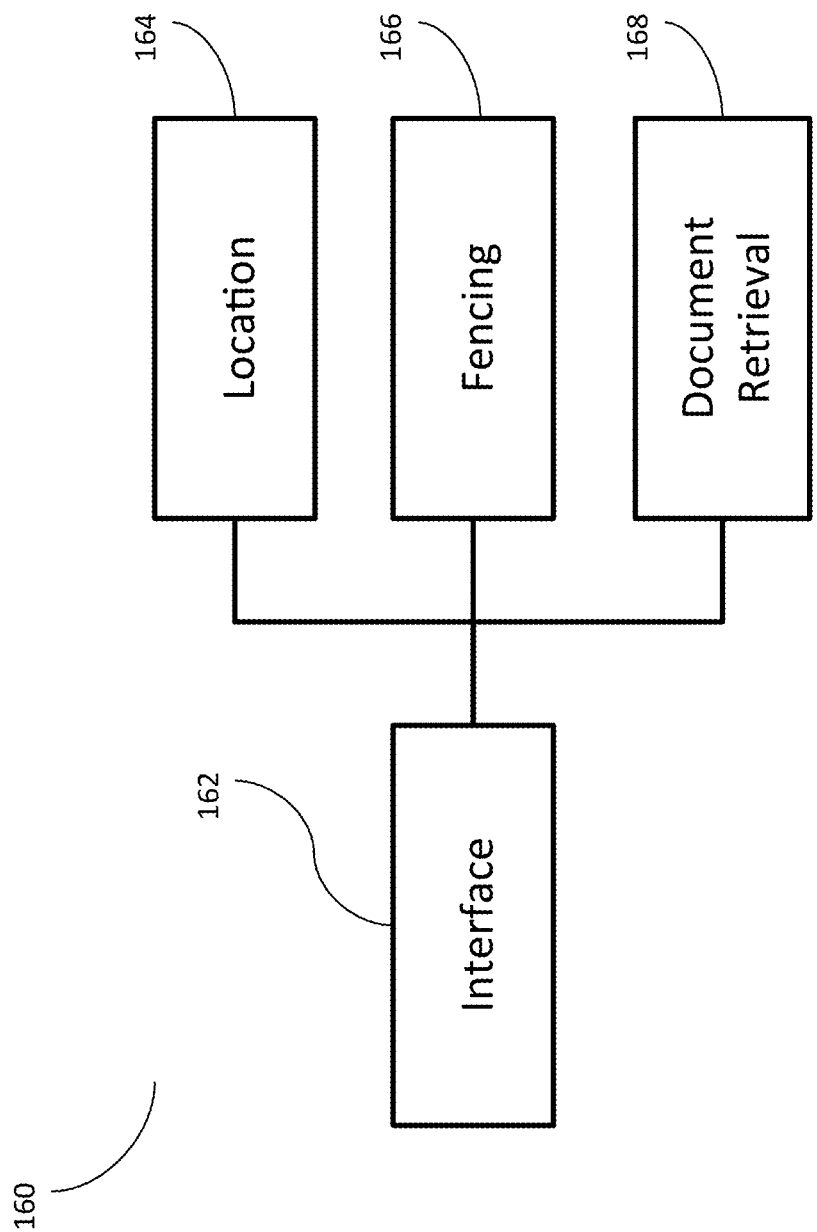
FIG. 1C is a block diagram illustrating a few software engines in the computer system that can be used to carry out the method for smart location.

As shown in FIG. 1C, in one embodiment, the one or more servers 150 executing the software programs may provide one or more software engines or application programming interfaces (API) 160, including, for example, an interface engine 162 and a location engine 164. In a further embodiment, the one or more servers 150 executing the software programs may also include a fencing engine 166 and/or a document retrieval engine 168.

Figure 2:
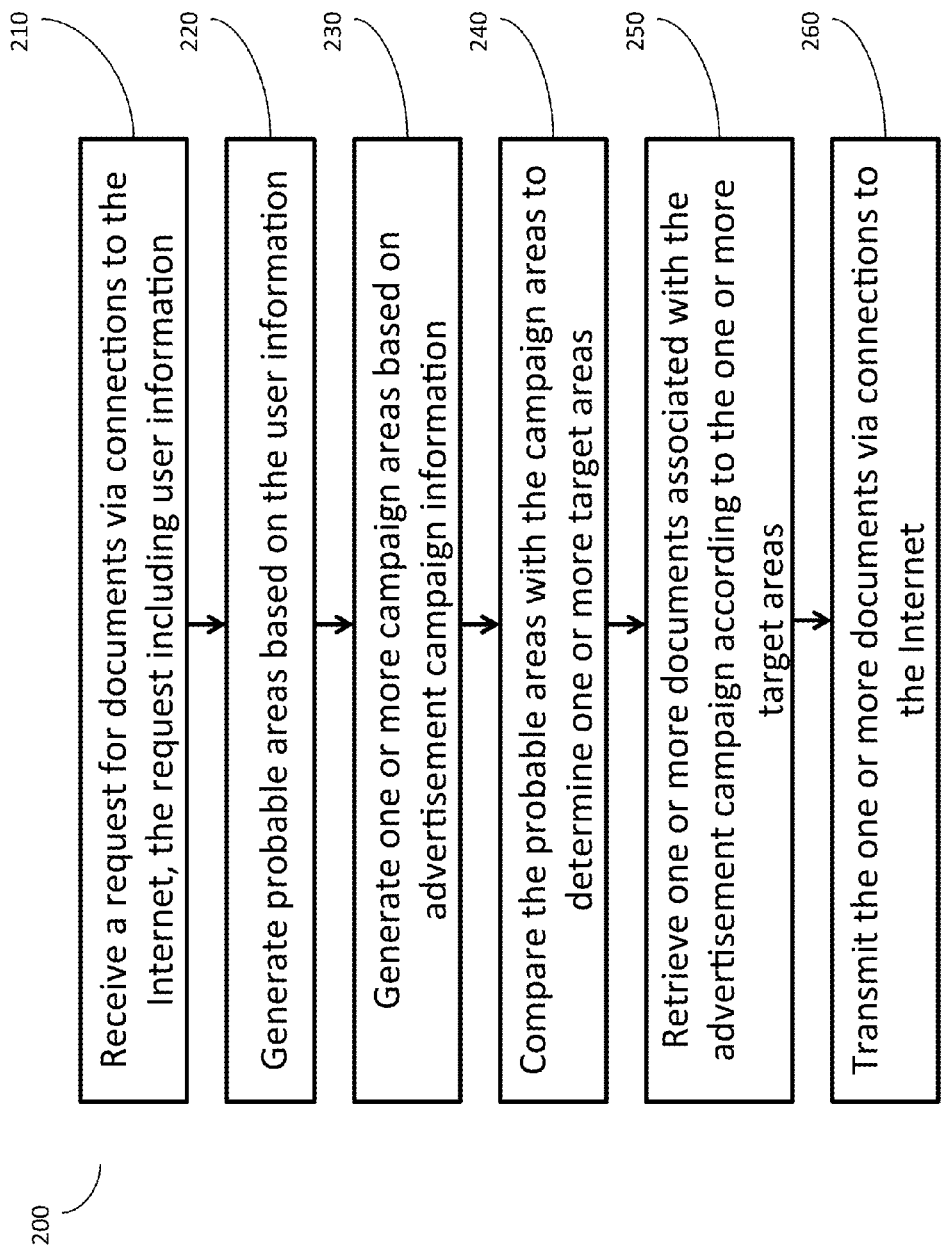
FIG. 2 is a flowchart illustrating a method for location-based document delivery according to embodiments of the present disclosure.

FIG. 2 is a flowchart illustrating a method 200 carried out by the one or more servers executing the software programs. According to one embodiment, in the context of on-line advertisements, the interface engine 162 is used to receive in 210 a request for documents via connections 156 to the Internet 120. The request includes information associated with a mobile user ("user information"). The location engine 164 is used in 220 to generate, using one or more methods described below, one or more probable areas or regions where a user of a mobile device 130 ("mobile user") could be located based on the user information received by the interface engine 162 via the Internet 120 from one or more mobile publisher, with whom the mobile user has initiated interaction using the mobile device 130 via one or more web services provided by the mobile publisher. The user information may be received in the form of, for example, a request for an advertisement ("ad request"). Each of the probable regions is associated with a probability of the user being in that region.

The one or more probable areas associated with the mobile user can be compared (e.g., overlapped) in 240 with certain fenced areas (or campaign areas) associated with advertisement campaigns to determine one or more target areas using the fencing engine 166. The fenced areas can be areas specified by marketers, such as cities, states, areas associated with shopping malls or shops, tourist attractions or certain zip codes. Or, the fenced areas can be arbitrary and dynamic areas generated in 230 using the fencing engine. For example, apparatus and method described in the commonly-assigned co-pending U.S. Pat. entitled "Method and Apparatus for Dynamic Fencing," filed on even date herewith, can be used to generate the fensed areas.

In one embodiment, each target area has an associated probability. The target areas, represented in some embodiments as points in a map, and information associated therewith can be used as inputs to the document retrieval engine 168 to retrieve one or more documents (e.g., advertisement) in 250 to be delivered to the user using the interface engine in 260. In one embodiment, the document retrieval engine chooses an advertisement associated with a target area with the highest probability. In another embodiment, the document retrieval engine performs a coin toss using the probabilities associated with the target areas as weight to choose an advertisement for delivery in response to the ad request. In a further embodiment, apparatus and method described in the in the co-pending U.S. patent application entitled "Method and Apparatus for Geographical Document Retrieval," filed on even date herewith, can be used to retrieve the document. The interface engine 162, location engine 164, fencing engine 166 and document retrieval engine 168 can be provided by one computer/server 150 or multiple computers/servers 150.

A direct application of probabilistic user location is for improving the ability to find and serve relevant advertisements to users interacting with mobile applications on smartphone and tablet devices. In this setting, the user is constantly in movement, and a key challenge in ad technology is to fill as many ad requests as possible with ads that are locally relevant to users. Fundamentally, the task of serving an advertisement is a probabilistic one, and as a result, it calls for solutions based on statistical modeling and machine learning techniques, all of which strive on massive volumes of data.

In one embodiment, a two-dimensional, statistical representation of user location data is used to enable novel forms of data-driven optimizations that can be implemented in other components of an ad technology stack. In the related Dynamic Fencing Application, systems and methods for generating dynamic geo-fences for advertisements are also based on two-dimensional statistical representations of user locations. In certain embodiments described in the related co-pending U.S. patent application entitled "Method and Apparatus for Geographical Document Retrieval," filed on even date herewith, such ads are matched with ad requests annotated with probabilistic user locations.

To comply with privacy laws, a user's location information is not tracked to know where a user is at any given time, unless a user voluntarily allows an application to use his/her current location in order to receive better service. When allowed, LL is believed to be a signal of high fidelity. However, even LLs may not be accurate depending on a number of factors such as:

1. Client-side GPS service works intermittently due to economical battery usage,
2. Carriers sample the location at regular intervals only, and
3. Constant user movement.

When a user doesn't allow his/her location information to be known, applications typically provide only coarse location data in the form of, for example, IP address of the device, a ZC (e.g. entered by the user at the time of registration), or CS.

Mobile applications and publishers frequently provide LLs obtained from geo-coding software, which translates ZC, CS, and other points of interests into one representative LL. In one embodiment, such representative LLs is categorized as "bad LLs". The bad LLs can be, for example:

1. A centroid of a ZC/CS
2. Any fixed point on a map (e.g. (0,0) or an arbitrary location)

The problem with bad LLs is obvious: by reducing a 2D region into a single point, information is lost. Furthermore, when centroids are passed along to downstream services (such as ad servers), it misleads the ad server to think that the LL is the actual location of the user.

IP to location mapping software is commonly used in the industry to obtain CS, and sometimes ZC, LL, from a given IP. Such techniques suffer from various limitations:

1. A single IP could be allocated to different users at different times, and a single user could be allocated multiple IPs, depending on carrier, Internet Service Providers (ISPs), whether or not the device's communication mode changed at different times
2. Depending on the ISP/carrier, the allocation of IPs could be related to "local" geography
3. Once an IP is allocated, it remains with the user even if he moves out of the current CS, as long as the communication mode is not changed 4. ISPs use Network Address Translation, and hence the IP passed could represent a stationary location that is common to multiple users (and each user gets a unique internal IP)
5. Cell phones could use Wi-Fi to connect to the Internet, and the IP in this case would represent the Wi-Fi spot, and could further be subject to change over time as it could get the address from the ISP, and could be internal to the ISP. Even these IPs could change depending on whether or not the router is restarted, and hence not tied to this location always A key limitation of deterministic user location is that a predetermined order of priority among the various location data is assumed in most implementations. For example, LL is assumed to be more accurate than ZC, which in turn is more reliable than CS, which in turn is more reliable than IP mappings, etc. As a result, there is a lack of ability to associate levels of uncertainty to one or more location inputs.

Another limitation is that deterministic locations lead to a trivialization of location-based ad retrieval, making it as straightforward as string or integer matching. For example, an input location of Palo Alto, Calif. is treated as a string, and should only match ads that are located or targeted to Palo Alto, Calif. A ZC of 94304 should only match ads located in or targeted to 94304. The notion of neighborhoods (e.g. Palo Alto Hills or Barron Park) is lost and can only be recuperated with static dictionaries (e.g. mapping names to neighborhoods, ZCs to cities) as well as string manipulations (e.g. partial string matches).

This trivialization has led to a stagnation of location-based document retrieval technologies over the last decade as text-search engines and related techniques addressed most requirements for advertising. With the hyper-growth of mobile traffic which can generate trillions of ad requests annotated with fine-grained location data, innovations in geographic document retrieval is necessary for serving highly relevant local advertisements.

In one embodiment, the location engine 164 employs a smart location method 300 to generate one or more probable areas or regions where a user of a mobile device 130 ("mobile user") could be located. The smart location method 300 takes as input user information in a request for documents from a mobile publisher or application provider, such as:
1. Request Specific Information
   1. Location
      1. Latitude, longitude (LL)
      2. Zip code (ZC)
      3. City-state (CS)
      4. IP address (IP)
   2. Context
      1. Timestamp (Hour of day, Day of week etc.)
      2. User Identifier (UID) (could include other attributes that help identify a user)
      3. Publisher
2. Mapping data
   1. Location to corresponding spatial region (ZC/CS to a bounding polygonal region) along with their sizes
   2. Weight distribution (from display and search traffic) for these spatial regions
   3. Split of each of these spatial regions into a set of smaller regions, and weight (ex: requests) distributions over these smaller regions In one embodiment, the smart location method 300 generates a spatial representation of location, which is a set of regions with associated probabilities for smart matching downstream:

$$\text{SmartLocation}=(R_1,p_{R_1},R_2,p_{R_2},\ldots,R_k,p_{R_k})$$

where a region, $R_k$, is defined as $$R_k=(P_1,P_2,\ldots,P_m)$$

where a point, $P_m$, is given by $$P_m=(\text{Latitude}_m,\text{Longitude}_m)$$

and , $p_{R_k}$ represents the probability of region k and all probabilities of a SmartLocation add up to 1.

By representing a region as a set of points, the resolution of a region can be set to arbitrary levels depending on the number of points. For example, a region with three points can be used to encode a triangular-shaped region, four points a rectangular-shaped region, etc.

A ZC region, or ZC level region indicates a region derived from a ZC. Similarly, a CS region is a region derived from a CS. A smaller region is a region within a ZC region or a CS region. One simple way of dividing a ZC region into such smaller regions is by looking only at the first 3 (or 4 or 5) digits of lat/longs (for example, (30.000, −122.122) and (30.001, −122.123) may correspond to two opposite corners of a rectangular smaller region obtained by keeping 3 decimal digits).

Figure 3:
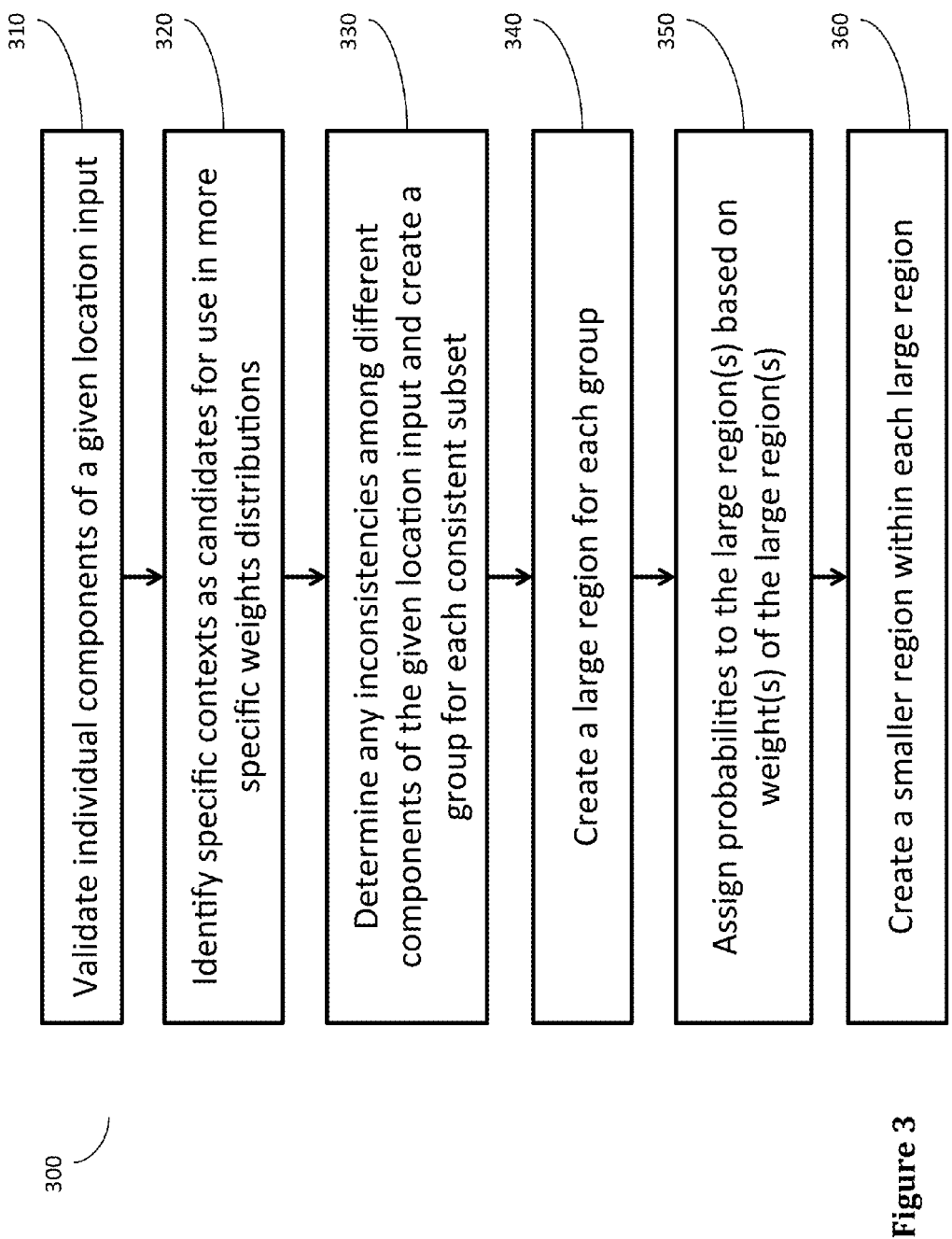
FIG. 3 is a flowchart illustrating a method for smart location according to embodiments of the present disclosure.

As shown in FIG. 3, the smart location method 300 of certain embodiments includes a validation phase 310 in which validation of individual components of a given location input is made and invalid components are ignored or discarded. The method 300 further includes an analysis of context phase 320 where specific contexts are identified as candidates for use in more specific weights distributions, and a groups creation phase 330 where inconsistencies among different components of the given location input is determined, and a separate group is created for each consistent subset. The method 300 further includes a large region creation phase 340 where a large region is created (typically at ZC or CS level) for each group, and a probability allocation phase 350 where probabilities are assigned based on weights of large regions of each group. The method 300 may further include an optional smaller region creation phase 360, in which a smaller region is created within each large region. For good LLs, the smaller regions are created based on sizes of regions, and for no LLs, or bad LLs, they are created based on weights distribution. In one embodiment, as the smaller regions are created, the probability of a large region is split between a newly created smaller region within the large region and that large region itself.

Data Mapping Examples

Figure 4A:
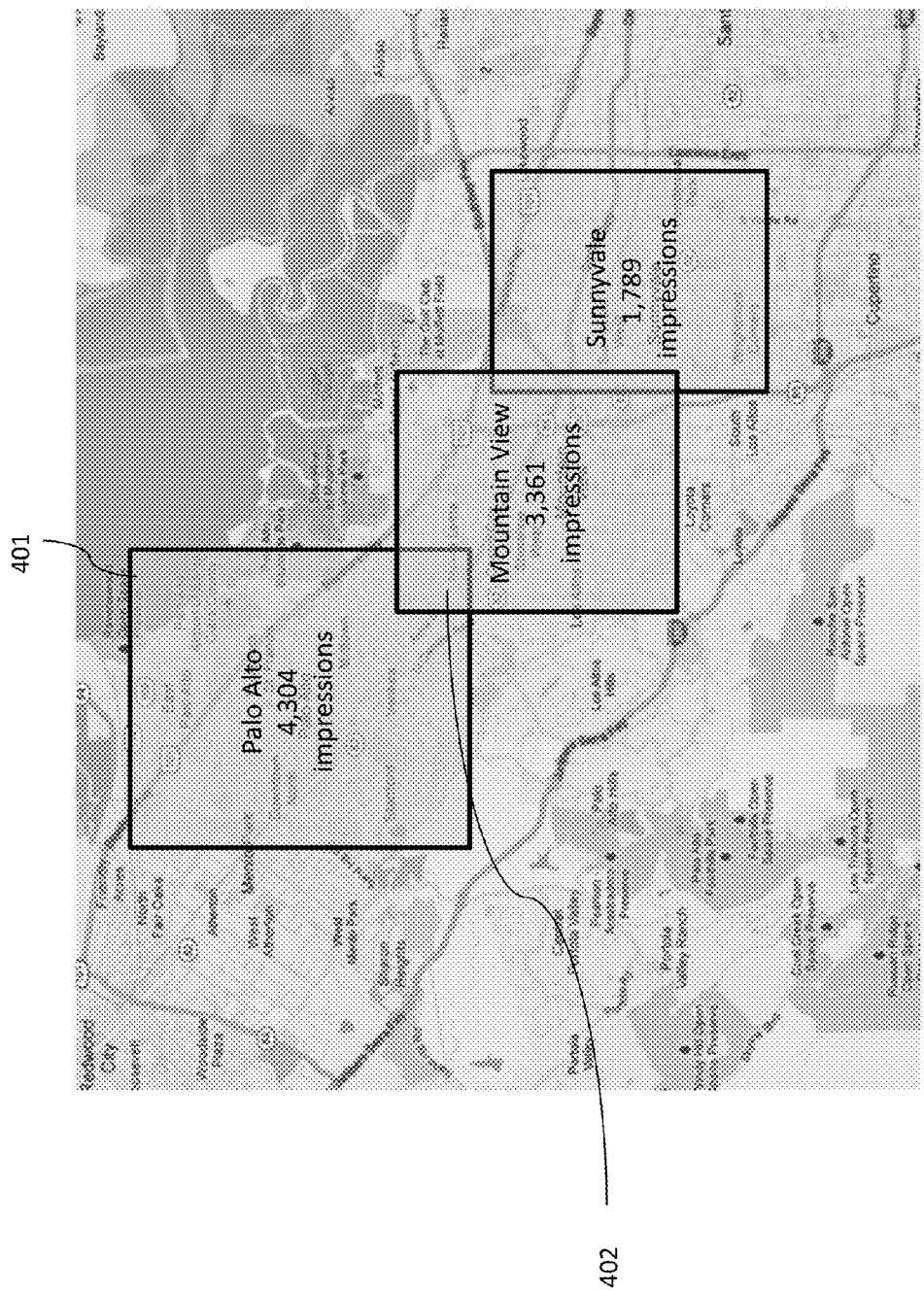
FIGS. 4A and 4B are diagrams illustrating CS and ZC regions with their associated weights according to embodiments of the present disclosure.
Figure 4B:
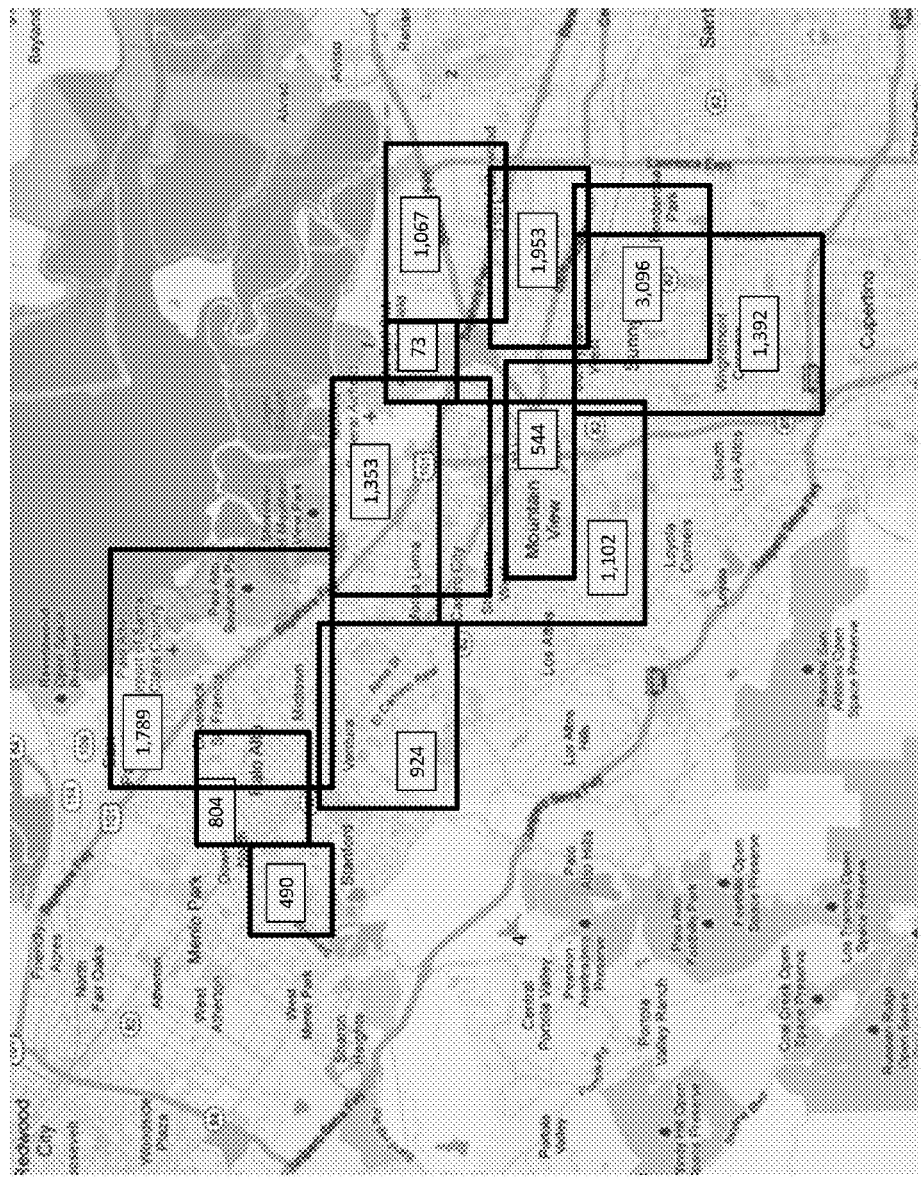

FIG. 4A illustrates CS regions 401 along with their weights (impressions). FIG. 4B illustrates ZC regions 401 along with their weights (impressions). FIG. 4A and FIG. 4B give examples of CS and ZC regions, respectively, as bounding rectangular boxes (although these can be of any other shape too). Note that these bounding boxes can overlap, and any LL that falls within an overlapped region can lead to both the partially overlapping regions 401 being associated with that LL. The numbers within each of the regions represent a "weight" associated with that region which can be used to allocate probabilities as explained further below. The weight could be any metric such as impressions, requests, CTR etc. Such terms, e.g., "weights", "impressions", and "requests" can be used interchangeably in the rest of the document.

When a request with input location (IP, LL, ZC, CS) comes and some of these location data are potentially null, there are 4 distinct cases that are possible, as described in the following as Case 1, Case 2, Case 3, and Case 4.

Figure 5A:
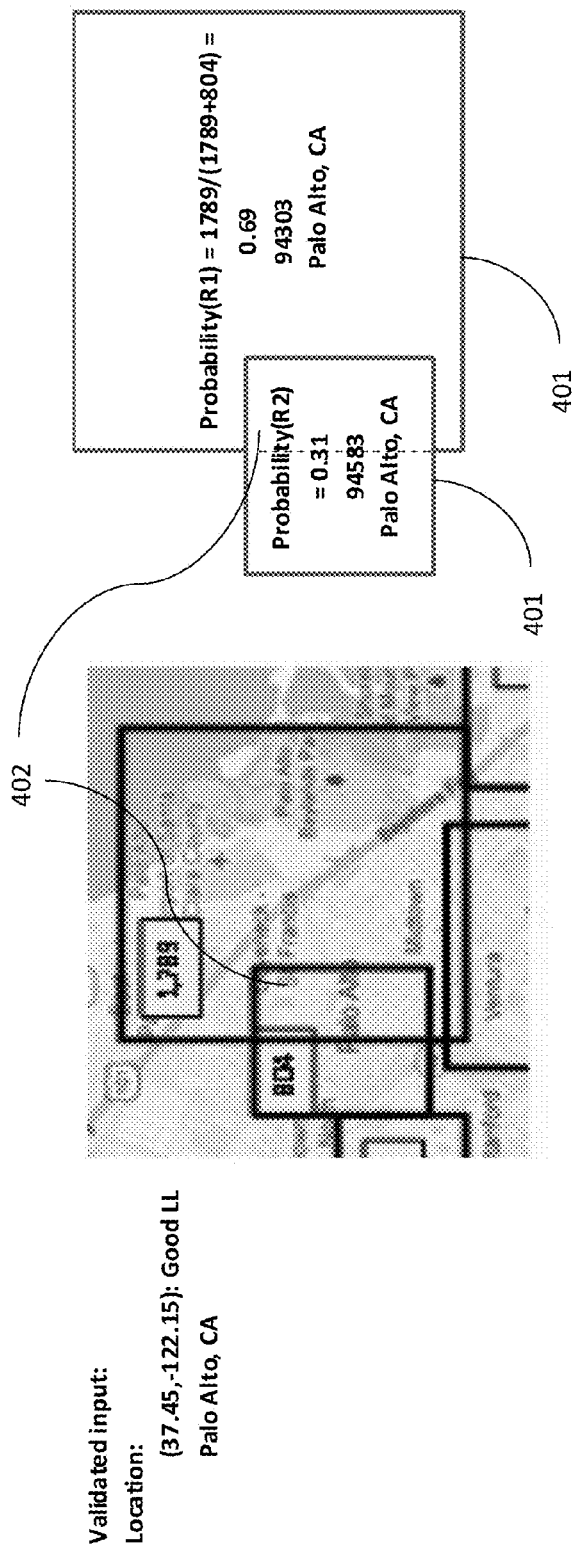
FIGS. 5A and 5B are diagrams illustrating probability allocations based on weights according to embodiments of the present disclosure.

Case 1: Overlapping regions—assume the given LL belongs to an overlapped region of two different ZCs or two different CSs. In FIG. 4B, a LL that falls in the intersection 402 of ZCs with 804 and 1789 impressions is another example of this case. When this happens, as shown in FIG. 5A, the probability is distributed among such overlapping regions according to their weights as illustrated.

Figure 5B:
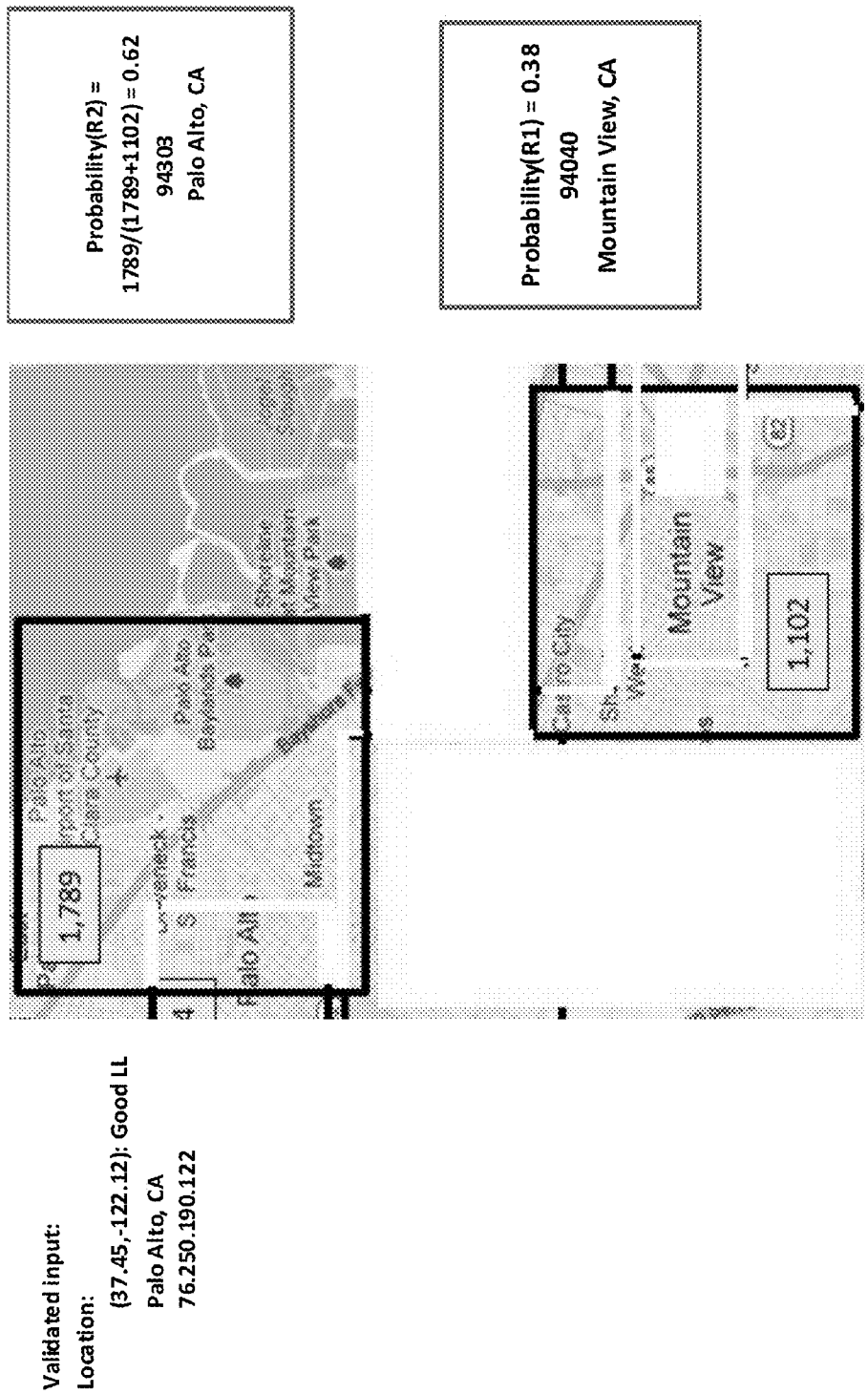

Case 2: Disjoint regions—assume the given LL belongs to a non-overlapping region of one ZC, but IP leads to another ZC through IP to geo mapping database. For example, in FIG. 4B, an LL may fall purely within the 94303 ZC with 1789 impressions, while an IP may lead to 94040 ZC in Mountain View. When this happens, as shown in FIG. 5B, similar to Case 1 with overlapping regions, the probability is distributed among such non-overlapping regions according to their weights as illustrated.

Figure 6:
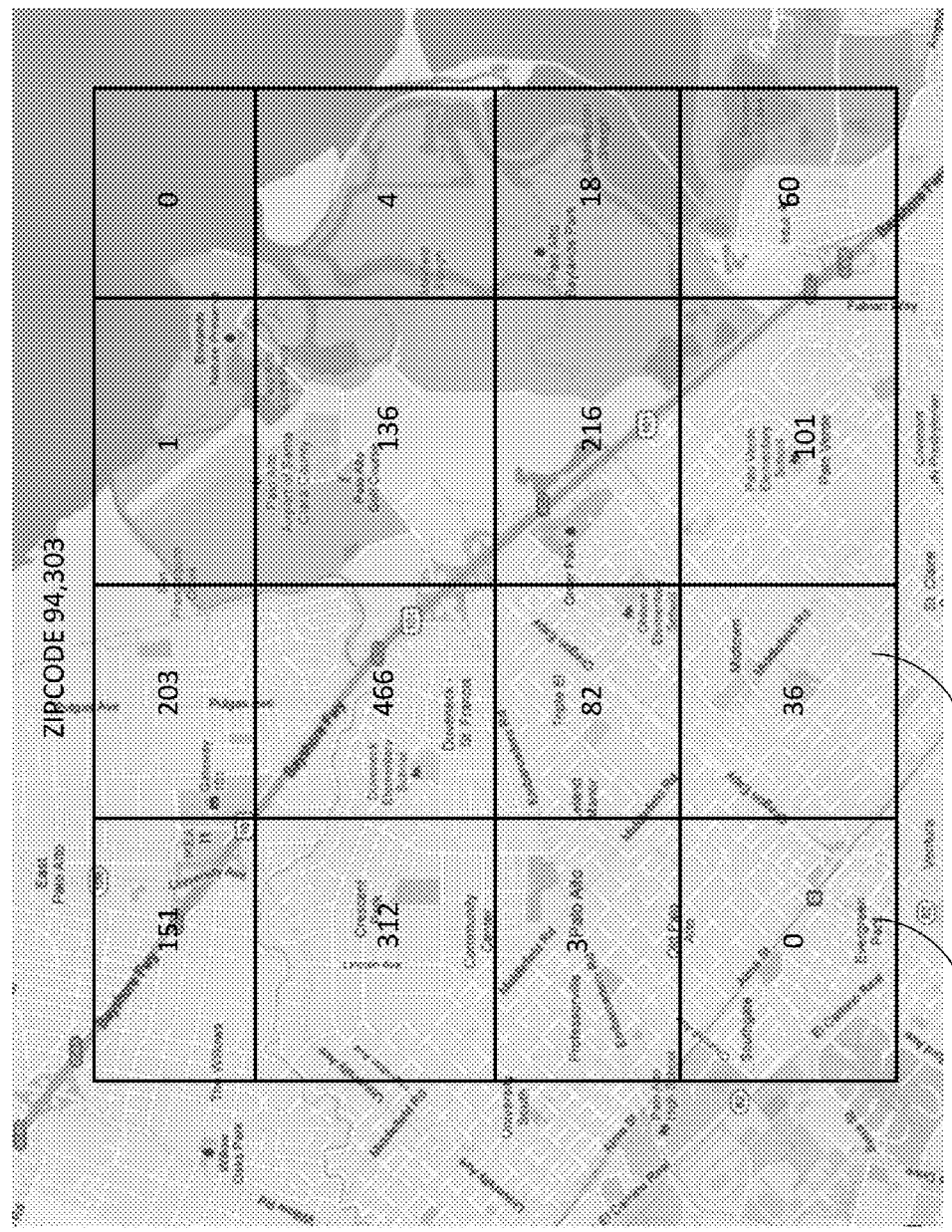
FIG. 6 is a diagram illustrating a ZC region divided into smaller regions in a grid according to an embodiment of the present disclosure.

Case 3: Embedded region—bad LL—Smaller Regions: FIG. 6 illustrates the weight (e.g., impressions) associated with a larger ZC region 601 (e.g., ZC 94303) being distributed among smaller regions 602 on a grid. The number within the smaller region indicates the weight (impressions) associated with that smaller region. The total weight of all smaller regions can add up to the larger region's weight. The weight used here is again the number of impressions. Although the figure shows a distribution for a ZC, similar approach is used for dividing CS regions too.

Figure 7A:
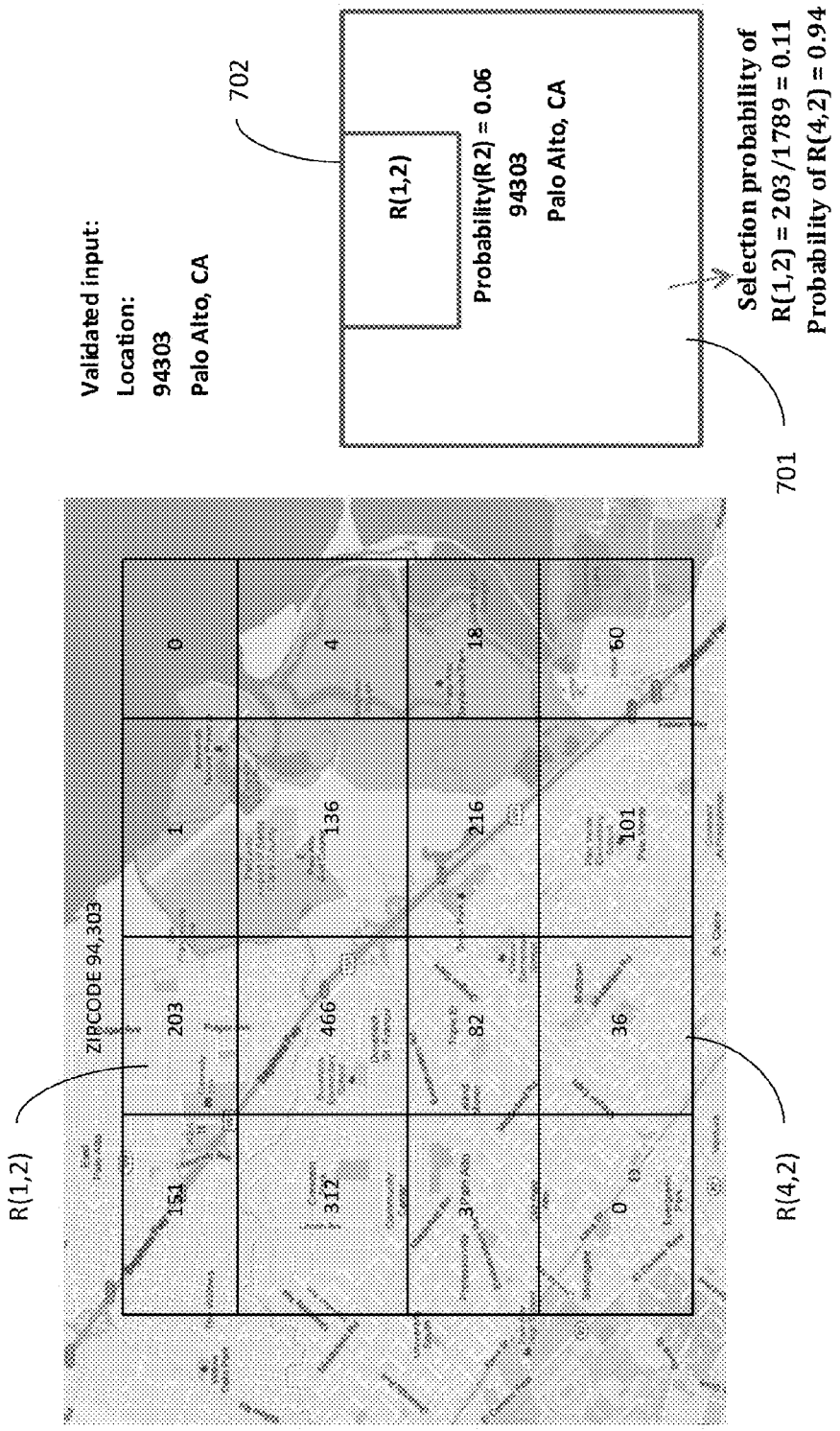
FIGS. 7A and 7B are diagrams illustrating allocation of the probability of the ZC region among the smaller regions according to an embodiment of the present disclosure.

When a request comes with just a ZC (or CS) (or given LL, IP are invalid and ignored), then we are left with just one large ZC (or CS) region. In this case, as shown in FIG. 7A, another smaller region 702 is created in addition to the larger region 701, and the probability of the larger region 701 is distributed between the larger region 701 and the smaller region 702. This can be done in 2 steps:
1. Select a smaller region from among the smaller regions of ZC according to weights distribution. For example, the second smaller region in the last row R(4, 2) can be selected with a probability of 0.02 (36/1789).
2. Distribute the probability of the larger region (in this case probability 1) between R(4,2) and R itself inversely proportional to their sizes. So, Probability of R(4,2), (assuming R(4,2) indeed is the selected smaller region), can be 0.02 ((1/16)/((1/16)+1/1))), as illustrated in FIG. 7A.

Figure 7B:
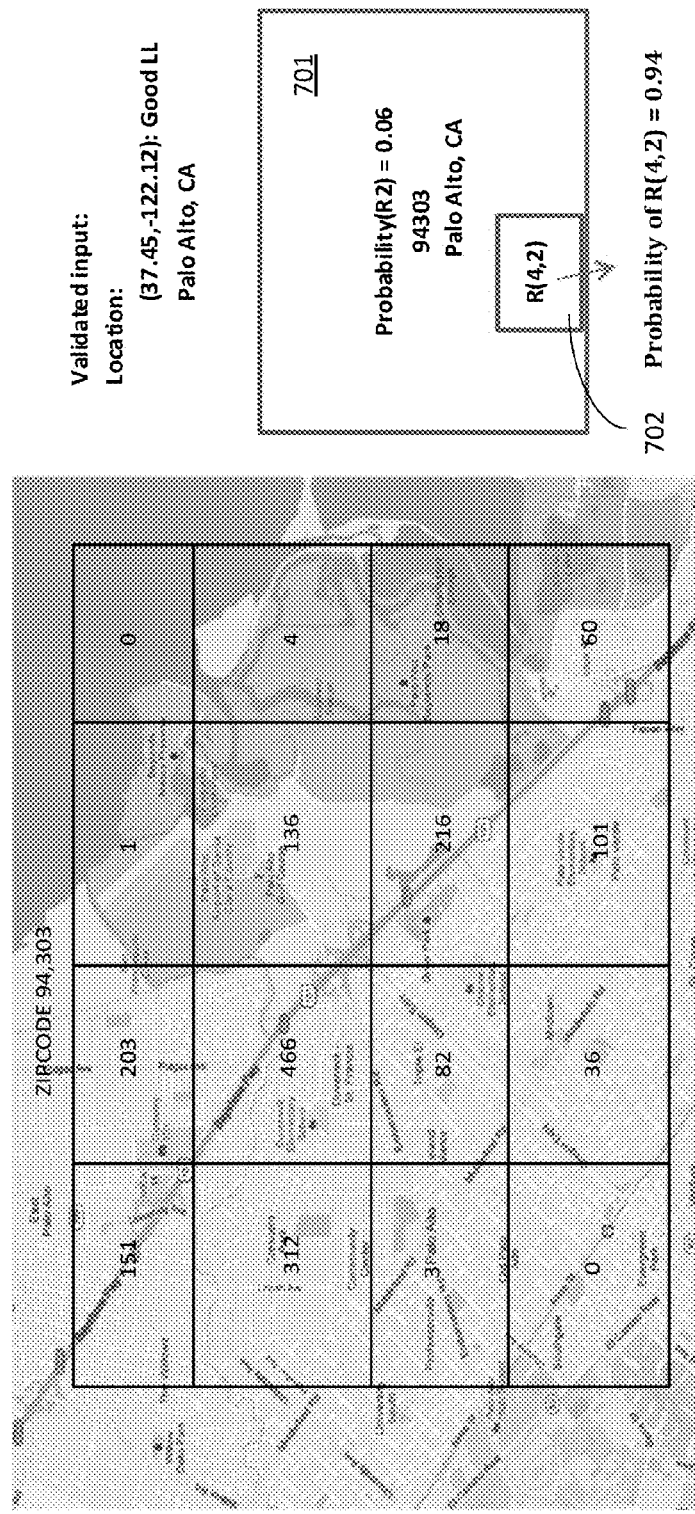

Case 4: Embedded Region—good LL—Smaller Regions: When a good LL comes as part of a request that belongs to a specific ZC/CS large region, as shown in FIG. 7B, a small region can be created around that given LL itself. The probability associated with the large region is then divided between the large region and smaller region by using a rule that gives more weight to smaller region, and some small weight to the surrounding larger region. This division is done similarly to what is done in the second step of Case 3 above—i.e, divide the probabilities inversely proportional to their sizes, as illustrated in FIG. 7B.

In one embodiment, the different phased in the smart location method 200 are carried out using a set of procedures, including one or more validation procedures, one or more context analysis procedures, one or more group creation procedures, a region creation procedure, a probability allocation procedure, and/or one or more smaller region creation and probability allocation procedures, which are discussed in further detail below. In one embodiment, uncertain data are dealt with in several distinct phases, such as:
1. Validate the given location input
   1. Whether individual non-null LL, ZC, CS is valid by itself (Validation Procedure 1)
   2. Whether LL is a bad LL or a good LL (Validation Procedure 2); bad LLs are discarded
2. Analyze the given context—Analyze whether the given context (a combination of one or more of a timestamp, a UID, an IP) has been associated with a more specific set of weights distribution—if not, use a more general set of weights distribution corresponding to No Context (Context Analysis Procedures)
3. Convert the given location input into one or more consistent groups of location inputs—each having a consistent subset of location input (Group Creation Procedures)
4. For each group, $G_i$, obtained above, obtain a corresponding larger region
5. For each group, $G_i$, obtained above, allocate probabilities (Probability Allocation Procedure) based on weights of larger regions obtained
6. For each region of group, $G_i$, obtained above, create a smaller region optionally (Region Creation Procedures)
   1. A small region created within the larger region
   2. For good LLs, they are created based on sizes of regions
   3. For no LLs, or bad LLs, they are created based on weights distribution In one embodiment, a first validation procedure is used to determine the validity of individual components of a location input. This procedure takes care of individual components by themselves. If a component of location input is invalid, then it is simply discarded. ZC, CS, LL to ZC mapping, and IP to Geo info mapping data sources can be used during this procedure.

In one embodiment, a second validation procedure is used to categorize a given LL as good or bad. For example, if the LL corresponds to a centroid of a ZC, or CS, or one of the fixed points of a mapping data source such as IP to geo conversion, it is considered as a bad LL. Otherwise, it is a good LL.

Sometimes, what comes as real LL from an application actually corresponds to ZC/CS centroids (within 5 decimal digit accuracy), or one of few such locations. Hence once it is determined to match one of these "fixed" locations, it is considered as a bad LL, and discarded. ZC and CS centroid data is used as a cache to verify this.

IP to geo conversion data sources are analyzed to figure out whether or not the LLs obtained correspond to a few such coarse LLs (within 5 decimal digit accuracy). If they do, this conversion data is marked as giving bad LLs and these LLs are discarded when IP to geo conversion is made.

There is a third case where some publishers may use a similar geo mapping data source to obtain an LL and pass it. These may not match the centroids. An online version of this procedure can be implemented where the LLs from publishers are added to a cache (keeping 5 decimal digits), and if the ratio of number of LLs in the cache to the number of requests with LLs is very small, then it is concluded that this publisher sends bad LLs. While offline analysis on publisher basis can reveal such publishers, online implementation is both simple and can deal with newly added publishers faster.

In the context analysis procedures of certain embodiments, multiple regions are created when a publisher sends inconsistent location data. One way of obtaining weights for each region is based on default weights distribution. A number of requests within the regions are considered here as weights (although any of other metrics such as the impressions, clicks or CTR, or a combination of these could also be used). Denoting this case as having No Context (NC), the Weight (W) for each region, R, is given as:

$$W_{NC,R} = \sum_C requests_{C,R}$$

where C represents an arbitrary context, so essentially, all possible contexts, or all requests, are summed over for each region separately. Similarly, given some context C, the weights for each region, R, can be computed as:

$$W_{C,R} = \text{requests}_{C,R}$$

where the requests correspond to that context alone. Sometimes, the context may be helpful in obtaining more reliable location information, and in such cases, the second formula is used. Otherwise, the NC formula can be used as default. A cache of $C \rightarrow \{W_{C,R}\}$ is derived from historical analysis and used at serving time. Given a context at serving time, this cache is used to retrieve the set of $\{W_{C,R}\}$ and, when the specific regions involved become known subsequently, the specific $W_{C,R}$ can be rectrived.

In some embodiments, the second formula may be better to use for certain context types, such as Context Types 1-4 discussed below.

In Context Type 1, some publishers pass the user identification (UID) since they are permitted to do so as part of their application. If a publisher, $Pub_1$, is known to send actual UIDs, it represents a case where $(Pub_1, UID_k)$ can be taken as a context in obtaining the weights using the second formula.

In Context Type 2, a publisher sends only user registration based ZC, and possibly nothing else. Since this typically represents a user's home ZC, it can be relied on more during night time. During the day time, the IP can be relied on to get an approximate location. Basically, both user registered ZC and IP converted location are not always correct about a user's current location. Yet, the less reliable region is kept also but with a lower probability. Hence, the context weights rule discussed above is still applicable in this case where context can be implemented in one of two ways:
1. Context consists of the publisher, UID and timestamp: $(Pub_1, UID_k, TS_k)$
2. Context consists of the publisher, ZC Type (User Zipcode/ Other Zipcodes) and timestamp: $(Pub_1, ZCT, TS_k)$ The second option is at a higher level of granularity and can be more useful when the first option suffers from lack of insufficient data for training In Context Type 3, some publishers have enough requests from them to track weights separately for them. This is very likely to be more effective than aggregated weights from all publishers since the uncertainty is partly owing to a publisher's app and the way they handle location input. In this case, the context is simply $(Pub_1)$.

In Context Type 4, as a consequence of IP allocation methods used by carriers, it is possible that a user can be assigned an IP that he keeps as he moves from one location to another. Assuming the user follows typical daily patterns of use, it is possible to think that this IP can have few specific LLs associated with it over a relative short period of time (e.g., a few days) before it is possibly reallocated to someone else. If it is allocated to other users over this period, then the number of locations associated with this IP over the same period can be higher and can fall through a preset threshold. If the associated LL represents one of the central locations owing to IP to geo conversion database's accuracy, those LLs can be removed from consideration even though they are below the threshold (special case).

In the end, some surviving IPs are resolved to represent proxies of user identities (called $PUID_{IP}$) below. These are short-lived mappings based on previous few days of observation, and are applicable for a vrelatively short future time period. Each of the IPs can have a few LLs associated with it (that could be mapped to small regions around these LLs). The probability of each of these LLs also could be pre-computed based on the number of requests within those small regions around those LLs.

At serving time, if an IP (context in this case) matches one of these special IPs, representing proxy UIDs (PUIDs), then associated regions can serve as potential regions with associated probabilities.

For example, let Region Set of given IP, $RS_{IP}$ be:

$$RS_{IP} = \left\{ R, p_R \;\middle|\; \begin{array}{l} R \text{ is a small region around given } LL \\ \text{of request with given } IP, \\ \text{and } p_R \text{ is the probability of } IP \text{ occuring with } R \end{array} \right\}$$

where small region around an LL is created according to Region Creation Procedure 2. Then, $PUID_{IP}$ is defined as:

$$PUID_{IP} = \left\{ RS_{IP} \;\middle|\; \begin{array}{l} LL \text{ of } RS_{IP} \text{ is not a central location} \\ \text{and } |RS_{IP}| < K \text{ for some constant } K \end{array} \right\}$$

There can be an order of importance of different context types. Given a context, it can match multiple sets of weights since it matches multiple context types. For example, given a publisher and UID, both Context Type 1 and Context Type 3 can be matched. In one embodiment, the type with most components is taken. When the same number of components (but different components) matches, an explicit order among those is forced. Context Type 4 is an exception, and is always used when applicable along with one of the other types. So, for Context Type 4, two matching set of weights can be retrieved.

When context is used to retrieve a set of $\{W_{C,R}\}$, it is possible that a region may not exist for the location input obtained. In such cases, $\{W_{NC,R}\}$ can be used as default weights.

Once the location input components are individually validated, and invalid components discarded, what remain are all valid on their own. However, it is still possible that they may be inconsistent among themselves. For example, when ZC and CS are given, and the ZC is not associated with the given CS, there is no basis to prefer one to another without any historical analysis. The aim of the group creation procedures is to separate the inconsistent location input into multiple groups that contain consistent components within each group separately. The probability allocation procedure can subsequently allocate probabilities to these groups appropriately based on prior historical analysis.

The following procedure can be used to split inconsistent location input to obtain multiple groups (location components have suffix IP or LI (Location Input)):
1. If IP is given, use IP to geo conversion to get ($CS_{IP}$, $ZC_{IP}$, $LL_{IP}$);
   1. If $LL_{IP}$ is a bad LL, discard it (Validation Procedure 2);
   2. If ($CS_{IP}$, $ZC_{IP}$, $LL_{IP}$)=($CS_{LI}$, $ZC_{LI}$, $LL_{LI}$) then do nothing since IP is not contributing anymore than other input available;
      1. Null component comparison always succeeds;
   3. Else if ($CS_{IP}$, $ZC_{IP}$)=($CS_{LI}$, $ZC_{LI}$) then associate IP with this ZC group;
   4. Else if $CS_{IP}$=$CS_{LI}$, then associate IP with CS;
   5. Else create one group with (IP, $CS_{IP}$, $ZC_{IP}$, $LL_{IP}$); label it as IP Group;

2. If ZC is not in a given CS, then create two different groups—one for ZC (and its derived CS), and another for CS;
  1. If ($ZC=ZC_{IP}$) put IP with ZC group;
  2. If ($CS=ZC_{IP}$) put IP with CS group;
3. If a good LL is present, use LL to geo map to get corresponding ZCs and/or CSs (note that more than one ZC boundary could match this LL);
  1. If any of ZCs match with the group with ZC, then associate LL with that ZC with the group with ZC;
  2. Else any of if CSs match with the group with CS, then associate LL with that CS with the group with CS;
  3. Else create a new group with LL and its derived ZC and/or CS; and/or
  4. If an $LL_{IP}$ is with ZC/CS group, this LL can replace it.

Note that if all components of location input are consistent, only one group may need to be created.

In the region creation procedure, the set of $\{W_{C,R}\}$ data, which is obtained during context analysis to determine the associated large ZC/CS level region along with its weight, is used for each group. These regions should already have associated weights obtained through background processing of historical data. Each region can also have an associated set of small regions with their own weights.

In case of IP Groups, the associated $\{W_{C,R}\}$ may also represent a set of regions to have in the smart location method with those weights. In this case, multiple large regions can be created, one per region in this set. Also note that each of these regions can have a specific LL that can lead to a small region around it as described later on.

In the probability allocation procedure, weights distribution is used to allocate probabilities to different regions. They are computed as follows:

$$Prob(G_i \mid C) = \frac{W_{C,G_i}}{\sum_{G_k} W_{C,G_k}}$$

where $G_k$ varies over all groups of that request and $W_{G_i}$ is the weight of the region associated with the group $G_i$ under context C, which can also be NC. In case IP Group is one of the groups, the maximum weight is used in this formula, somewhat arbitrarily.

For non-IP groups, the probability of the associated region is the same as that of its group:

$Prob(R_i|C)=Prob(G_i|C)$

For IP Groups, the obtained probability by using the above formula is distributed among the regions it contains according to its own weight distribution (recall that in this special case, two weight distributions would have been retrieved):

$$Prob(R_i \mid C) = \frac{W_{C,R_i}}{\sum_{R_k} W_{C,R_k}} * Prob(G_i \mid C)$$

where i now varies over all regions of IP group, and the weights are associated with those regions.

So far, only large regions are created, and they correspond to consistent subset of original location input. Some of these may have LLs, and if they do, they are good LLs. In such cases, one or more smaller region creation and probability allocation procedures of some embodiments are used to create a small region around the given LL as it is more representative of where the user is. The larger surrounding region is kept with a lower probability of where the user is to account for the uncertainty with the given LL.

In one embodiment, a small or smaller region is a region within a ZC region or a CS region. One simple way of dividing a ZC region into such smaller regions is by looking only at the first 3 (or 4 or 5) digits of lat/longs (for example, (30.000, −122.122) and (30.001, −122.123) may correspond to two opposite corners of a rectangular smaller region obtained by keeping 3 decimal digits).

In one embodiment, this can be done by: a) taking the bounding rectangle of a ZC (or CS), and expanding outward until the corner LLs have 0 in decimal places beyond 3 (or 4 or 5 depending on different implementations), and b) dividing this into a grid of width proportional to 3rd (or 4th or 5th) decimal accuracy. Along the boundaries, the region could cross ZCs, but it shouldn't matter at all.

By keeping each request's first N decimal digits and obtaining the weights (requests) distributions, the distribution can be smoothed to a desired extent. The number of decimal digits to keep in this function can vary from one ZC/CS region to another depending on the total number of requests in that region. This allows for regions that are highly dense to keep more digits (smaller grid) because requests are likely to occur in a statistically significant manner within each smaller region of the grid. The number of digits of accuracy used for a region is determined in the background process while building the weights distribution, and is associated with it.

For each large region, $R_i$, with good LL, an additional small region can be created. For example, $N_{R_i}$ tells us how many decimal digit accuracy is used, and how many small regions, $R_i$, are present. Hence, the give good LL can be truncated to this accuracy to obtain the lower corner of the smaller region, $R_{i_{LL}}$, into which it falls. The upper corner of the small region can be obtained simply by incrementing the lowest decimal digit of both latitude and longitude. The probability, Prob ($R_i|C$), can now be split between these two, which are inversely proportional to the size of the regions so that the smaller region gets more of the probability and the larger one gets the remainder such that an area around the given LL is more relied up than the surrounding area, i.e.:

$$Prob(R_{i_{ZCorCS}} \mid C) = \frac{1}{N_{R_i} + 1}$$

$$Prob(R_{i_{LL}} \mid C) = \frac{N_{R_i}}{N_{R_i} + 1}$$

where $R_{i_{ZCorCS}}$ is the original large region at ZC or CS level.

In one embodiment, one or more allocation procedures are used to create a small region within a given ZC (or CS) region. When a given LL is a bad LL, or it is not given at all, businesses within that entire ZC (or CS) are equally likely no matter what the distribution of users/requests within that ZC is. This is a crude approximation and has a potential to match a same set of businesses. More reliable LL requests from search and display data can be analyzed to arrive at the spatial request distributions offline, and used to allocate incoming requests at a more granular level to different smaller regions within that ZC/CS. This approach is intuitively more appealing to achieve a reasonable distribution of requests among businesses, and hence improve overall metrics. This is achieved by creating a grid (as indicated earlier) with given decimal digit accuracy, by mapping requests to these grids, and then by developing a request distribution over the smaller regions of this grid.

In one embodiment, each ZC and CS is regarded as a region with a bounding rectangle where a separate spatial discrete probability distribution is generated with the LL as a discrete random variable, as follows:

$$P(\text{region}) = \sum_u Pr(X = u) = 1$$

where u runs over all values of X, i.e., all LLs in that region are converted to a given decimal digit accuracy, and $$Pr(X = u) = \frac{\text{Requests}(X = u)}{\sum_u \text{Requests}(X = u)}$$

where Requests are both search and display requests. Each u represents a small region. When an incoming request needs an allocation after validation procedures are applied, the above distribution can be used to pick a u.

Once a request with bad LL is allocated to a region, u, with probability distribution computed as above, a unique $LL_u$ can be generated within that region and a confidence factor can be associated therewith. For example, the unique $LL_u$ can be generated within this region using a uniform distribution, and a confidence factor (CF) can be associated therewith as $$CF(X = LL_u) = K * \frac{Pr(X = u)}{A_u}$$

where $A_u$ is an area of the smaller region, u, and K is a constant used for normalization across varying sites of small regions. K can be determined experimentally. The confidence factors generated as above can be adjusted to suit many practical considerations by choosing an appropriate value for the constant K. Any of various standard boosting techniques known in the industry could be used to pick a K.

The function defined as above can be extended to include additional attributes in addition to LL for the random variable. For example, the height of the location can be used to make it a 3-demensional space, and additional contextual attributes mentioned earlier can be added to make it a multi-dimensional space. The allocation procedure can remain the same within these different dimensional spaces.

We claim:

1. A method of delivering location-based information, comprising:
    receiving a request via connections to a packet-based network, the request including a location indicator, the location indicator including first location components;
    deriving one or more second location components from one or more of the first location components;
    forming one or more location component groups each including a respective subset of one or more location components selected from the first location components and the one or more second location components, the respective subset of one or more location components being determined to be consistent with each other;
    generating a probabilistic representation of a mobile user's location based on the location indicator and historical data collected from mobile devices, the probabilistic representation including one or more probable geographical areas each having an associated weight, each of the one or more probable geographical areas corresponding to a respective one of the one or more location component groups;
    retrieving information from a data store based on the probabilistic representation; and
    transmitting the information to the packet-based network for receipt by the mobile user.

2. The method of claim 1, wherein the first location components of the location indicator include at least one of a first code associated with a place or region, a first name associated with a place or region, first geographical coordinates, and an Internet Protocol (IP) address, and wherein deriving one or more second location components from one or more of the first location components comprises:
    in response to the first location components including the IP address, obtaining one or more derived location components from the IP address; and
    in response to any of the one or more derived location components being inconsistent with a corresponding one of the first location components, assigning the one or more derived location components to a separate location component group from the one of the first location components.

3. The method of claim 1, wherein the first location components include geographical coordinates, the method further comprising:
    comparing the geographical coordinates with a set of pre-recorded coordinates to determine whether the geographical coordinates are valid location components; and
    removing the geographical coordinates from the first geographical components in response to the geographical coordinates being determined as invalid.

4. The method of claim 1, wherein the one or more location component groups include a first location component group and a second location component group, the first location component group including at least one location component that is inconsistent with at least one location component in the second location component group.

5. The method of claim 1, further comprising: comparing the probable geographical areas with one or more fenced areas to obtain one or more target areas each having the associated weight, each target area representing an overlapped region between one of the one or more probable geographical areas and a fenced area.

6. The method of claim 5, wherein the information is retrieved based on the one or more target areas and their associated weights.

7. The method of claim 1, wherein the request further includes a context indicator, and the information is further retrieved based on the context indicator, the context indictor including one or more of a timestamp, a user identifier and a name of a publisher with whom the mobile user is interacting.

8. The method of claim 7, wherein generating the probabilistic representation of a mobile user's location comprises: identifying one or more components in the context indicator as candidates for use in calculating a weight distribution.

9. The method of claim 1, wherein the one or more probable geographical areas include a first probably geographical area the method further comprising: defining a smaller geographic region within the first probable geographical area and allocating the weight associated with the first probable geographical area among the smaller geographic region and the first probable geographical area.

10. The method of claim 9, further comprising: allocating the weight associated with the first probable geographical area between the first probable geographic area and the smaller geographic region such that the allocated weights are inversely proportional to respective sizes of the first probably geographic area and the smaller geographic region.

11. The method of claim 1, further comprising:
creating a grid to define a plurality of smaller geographic regions within the first probably geographic area;
mapping historical requests to the plurality of smaller geographic regions; and
developing a request distribution over the smaller geographic regions.

12. An apparatus, comprising:
connections to a packet-based network;
one or more data stores storing therein historical data collected from mobile devices communicating with the packet-based network;
an interface engine configured to receive a request from the packet-based network, the request including a location indicator, the location indictor including first location components; and
a smart location engine configured to: derive one or more second location components from one or more of the first location components; form one or more location component groups each including a respective subset of one or more location components selected from the first location components and the one or more second location components, the respective subset of one or more location components being determined to be consistent with each other; generate a probabilistic representation of a mobile user location based on the location indicator and historical data collected from mobile devices, the probabilistic representation including one or more probable areas each having an associated weight, each of the one or more probable geographical areas corresponding to a respective one of the one or more location component groups.

13. The apparatus of claim 12, wherein the first location components of the location indicator include at least one of a code associated with a place or region, a name associated with a place or region, geographical coordinates, and an Internet Protocol (IP) address, and wherein deriving one or more second location components from one or more of the first location components comprises:
in response to the first location components including the IP address, obtaining one or more derived location components from the IP address; and
in response to any of the one or more derived location components being inconsistent with a corresponding one of the first location components, assigning the one or more derived location components to a separate location component group from the first location components.

14. The apparatus of claim 13, wherein the one or more location component groups include a first location component group and a second location component group, the first location component group including at least one location component that is inconsistent with at least one location component in the second location component group.

15. The apparatus of claim 13, further comprising: a fencing engine configured to provide one or more fenced areas.

16. The apparatus of claim 15, wherein the fencing engine is further configured to compare the probable areas with the one or more fenced areas to obtain one or more target areas each having an associated weight, each target area representing an overlapped region between one of the one or more probable geographical areas and a fenced area.

17. The apparatus of claim 16, wherein the one or more data stores further stores location-based information, the apparatus further comprising a document retrieval engine configured to retrieve location-based information from the one or more data stores based on the target areas, and wherein the interface engine is further configured to transmit the location-based information to the packet-based network for delivery to the mobile user.

18. A method of determining a mobile user location by a computer system coupled to a packet-based network, comprising:
receiving a request from the packet-based network, the request including a location indicator, the location indicator having first location components;
deriving one or more second location components from one or more of the first location components;
forming one or more location component groups each including a respective subset of one or more location components selected from the first location components and the one or more second location components, the respective subset of one or more location components being determined to be consistent with each other; and
generating a spatial representation of the location of the mobile device based on the request, the spatial representation including one or more probable geographical areas each having an associated weight, each of the one or more probable geographical areas corresponding to a respective one of the one or more location component groups.

19. The method of claim 18, wherein the plurality of location components include a set of geographical coordinates, wherein removing any invalid location component from the location indicator comprises removing the set of geographical coordinates if the set of geographical coordinates correspond to a set of pre-recorded coordinates.

20. The method of claim 19, wherein the set of fixed locations include locations corresponding to centroids of fixed regions, each of the fixed regions being one of a city, a state, and a region corresponding to a zip code.

21. The method of claim 18, wherein the request further includes context information including one or more of a time stamp, a user identifier, a publisher name, the method further comprising determining the weight associated with a respective one of the probable geographical areas using the context information.

22. The method of claim 18, determining the weight associated with a respective one of the probable geographical areas using historical data.

23. The method of claim 18, wherein the first location components include an IP address, the method further comprising:
obtaining one or more derived location components from the IP address; and
in response to any of the one or more derived location components being inconsistent with a corresponding one of the first location components, assigning the one or more derived location components to a location component group.

24. The method of claim 18, wherein the plurality of location components include a set of geographical coordinates, wherein the one or more probable geographical areas include a first probable geographical area corresponding to a first group of the one or more location component groups, the first group including the set of geographical coordinates, the method further comprising: generating a smaller region within the first probable area using the set of geographical coordinates, and dividing the weight associated with the first probable area into a smaller weight associated with the first geographical area and a larger weight associated with the smaller region.

* * * * *

UNITED STATES PATENT AND TRADEMARK OFFICE
CERTIFICATE OF CORRECTION

| | | |
|---|---|---|
| PATENT NO. | : 9,049,549 B2 | |
| APPLICATION NO. | : 13/867021 | |
| DATED | : June 2, 2015 | |
| INVENTOR(S) | : Chi-Chao Chang et al. | |

It is certified that error appears in the above-identified patent and that said Letters Patent is hereby corrected as shown below:

On the title page, item 72, the inventors should be listed in the following order: Chi-Chao Chang, Palo Alto, CA (US); Prakash Muttineni, San Ramon, CA (US); Mauricio Mediano, Campbell, CA (US); Srihari Venkatesan, Cuppertino, CA (US); Dipanshu Sharma, New York, NY (US)

In the claims

Column 17, line 2, Claim 10, "probably" should be changed to --probable--

Column 17, line 4, Claim 11, insert the following text between "claim 1," and "further comprising:"

--wherein the one or more probable geographical areas include a first probably geographical area, the method--

Column 17, line 48, Claim 12, insert --one of-- between "from" and "the first location components."

Column 18, line 5, Claim 18, the text "mobile user location" should be changed to the following text:

location of a mobile device

Column 18, line 26, Claim 19, "plurality of" should be changed to --first--

Column 18, lines 28-29, Claim 19, cancel the text "removing any invalid location component from the location indicator" and insert the text --the method further-- before the text "comprising..."

Column 18, line 32, Claim 20, "fixed" should be changed to --pre-recorded--

Column 18, line 41, Claim 22, insert --further comprising-- before the text "determining the weight associated with..."

Signed and Sealed this
Thirteenth Day of October, 2015

Michelle K. Lee
*Director of the United States Patent and Trademark Office*

CERTIFICATE OF CORRECTION (continued)
U.S. Pat. No. 9,049,549 B2

Column 18, line 51, Claim 23, insert --separate-- before the text "location component group."

Column 18, line 53, Claim 24, "plurality of" should be changed to --first--